United States Patent Office 2,957,834
Patented Oct. 25, 1960

2,957,834

METHOD OF STABILIZING SOIL WITH AN AQUEOUS SOLUTION OF A COLD WATER SWELLING STARCH AND A RESIN

Fredrik André Möller, Haren, and Jan Lolkema, Hoogezand, Netherlands, assignors to Naamlooze Vennootschap W. A. Scholten's Chemische Fabrieken, Groningen, Netherlands, a corporation of the Netherlands No Drawing. Filed Mar. 22, 1954, Ser. No. 417,948

Claims priority, application Netherlands Mar. 23, 1953

10 Claims. (Cl. 260—17.2)

It is known that the presence of organic material, more particularly of humus, has an important influence on the structure and thus on the air-water economy of the soil. The structure of the soil is for a considerable part dependent on the percentage of the particles which are united to aggregates of the correct size and of sufficient stability. Said aggregates give the soil the desired crumb structure which is so exceedingly important for the properties of cultivated land. Generally the structure of cultivated land will be better according as the percentage of said aggregates is larger.

Agricultural investigations have shown that polysaccharides of the polyuronide type which are formed by micro-organisms present in the soil play a very important part in the formation of said aggregates. The polyuronides, however, are subject to bacterial decomposition, so that the aggregates formed are not stable and in the long run disintegrate to powder. This has for its result that the crumb structure disappears and that the soil loses its good aeration and water regulation properties, so that in times of drought the surface layers will be liable to be blown away and in the case of heavy rainfall will be washed away. Moreover said poor aeration and water regulation very adversely affect the productivity of the soil.

In order to maintain the porous crumb structure it was generally necessary, therefore, to regularly incorporate into the soil large amounts of organic material, from which polyuronic acids are formed by bacteriological decomposition. It has also been proposed, however, to incorporate into the soil certain materials which would improve the structure thereof more permanently, such as hydrolyzed polyacrylonitrile, carboxymethylcellulose and other substances.

We have surprisingly found now that the structure of the soil may be improved rapidly and to a considerable extent if a slight proportion of a starch product which is dissolved in water or which is soluble or swells in cold water is added thereto and accordingly the invention relates to a process of improving the physical structure of the soil, which consists in that a starch product which is dissolved in water or which is soluble or swells in cold water is incorporated into the soil.

If in carrying out the invention starch products are used which are not soluble and do not swell in cold water, the addition of said products to the soil should be effected in gelatinized and accordingly in dissolved condition, because otherwise the desired effect is not attained. Starch products which are soluble or swell in cold water, on the other hand, may be introduced into the soil both in dissolved and in dry condition.

According to the most important embodiment of the invention we use the starch product, soluble or swelling in cold water which is commercially known by the name of cold swelling starch and the invention, therefore, will be described more particularly with reference to the use of said product. By a cold swelling starch we understand the product obtained by heating a mixture of starch or a starch derivative and water, preferably a limited proportion of water, e.g. 0.5–2 parts by weight of water to 1 part by weight of starch, for a short time to a high temperature, above the gelatinization point, the mixture being pressed out into a thin layer and dried simultaneously or immediately thereafter.

The cold swelling starches to be used may be derived from various natural starches, e.g. potato starch, corn starch, cassava starch, sago starch, wheat starch and waxy starches, from the components of starch, viz. amylose and amylopectin, or from degraded starch products, such as soluble starches and dextrin. They may be obtained from products which besides starch contain other substances, without said other substances being removed, e.g. from natural or artificial mixtures of starch or starch derivatives with proteins or cellulose, such as wheat flour, rye flour or buckwheat flour, ground cassava or manioc roots or the like.

By means of the cold swelling starches described above an important improvement of the physical properties of the soil can be reached. They present, however, the drawback, that they are easily attacked by the micro-organisms in the soil, so that their activity soon decreases. This drawback can be met by using cold swelling starches containing a preservative. For this purpose the known preservatives for starch products may be added, such as copper sulphate, zinc chloride, chlorinated phenols or cresols, e.g. tri or pentachlorophenol, parachlorometacresol, mercury cyanide, mercury chloride, organic mercury compounds, o-phenyl phenolsodium, p-hydroxydiphenyl and the like. The preservative may be intimately mixed with the finished cold swelling starch; preferably, however, the preservative is added to the starch or the starch derivative before same is converted into cold swelling starch in the presence of water. In this case the preservative is homogeneously disrtibuted throughout each cold swelling starch particle, which is of advantage if the cold swelling starch is mixed in dry condition with the soil to be treated.

The stability of the cold swelling starches may likewise be improved by preparing them in the presence of an aldehyde or a substance capable of splitting off aldehyde. These so-called aldehyde cold swelling starches are described in British Patents 494,927, 632,789 and 632,785. They are obtained by subjecting a mixture of starch or a starch derivative, water and an aldehyde or a substance capable of producing an aldehyde to the cold swelling starch process. Preferably this is effected in a non-acid or only slightly acid medium and at as low as possible a temperature; in this case soluble products may also be obtained when a relatively large proportion of aldehyde is used. For practical purposes the preferred aldehyde is formaldehyde.

The applicants have found that the aldehyde cold swelling starches described above substantially improve the physical properties of the soil and that, as compared with the ordinary cold swelling starches not containing a preservative, they have the important advantage of being less readily attacked by the micro organisms in the soil, so that their activity is maintained for a longer period of time.

A further improvement of the stability of the cold swelling starches may be achieved by preparing them in the presence both of an aldehyde and of a synthetic resin component or of a precondensate of said substances. Care should be taken that the products obtained are still soluble in cold water. This is possible by using as the synthetic resin component an amino triazine, more particularly melamine according to British Patent 632,791 or a phenol according to U.S.A. Patent No. 2,583,268, and by carrying out the cold swelling starch process in a neutral or alkaline medium.

If urea is used as the synthetic resin component insoluble products will generally form during the heating process on the roller. It is, however, possible to obtain soluble cold swelling starches suitable for the present purpose while using urea, if a starch degraded to a sufficient extent is used, as described in British patent application No. 8819/53.

In all of these cases products will form in which a certain degree of condensation between the starch, the aldehyde and the synthetic resin component has taken place. The effect of this condensation will be that the stability of the starch product against micro organisms is considerably increased.

An improvement of the stability may also be attained by using aldehyde cold swelling starches which have not been prepared in the manner described above by carrying out the cold swelling starch process in the presence of a synthetic resin component, but to which the synthetic resin component is added in a later stage. Products of this character are described in British Patent 494,927. It is also possible, simply to mix both the aldehyde or the substance capable of generating aldehyde and the synthetic resin component or a precondensate of said compounds intimately with the dry cold swelling starch. Such mixtures are described, inter alia, in British Patents Nos. 633,342 and 634,368. In these cases the aldehyde or the aldehyde and the synthetic resin component or a precondensate thereof are present in the mixture in a free condition, but in the soil a slow condensation with the aldehyde cold swelling starch or with the cold swelling starch will take place, whereby the stability of the product is increased.

The conditions under which this condensation will occur are most favourable in the top layers of the soil in which owing to the evaporation of water the solution will be concentrated, and if agricultural chemicals are added which impart an acid reaction to the soil.

If desired, the condensation of the aldehyde or of the precondensate with the cold swelling starch may be promoted by adding to the dry cold swelling starch preparation or to the solution thereof a catalyst, generally a compound having an acid reaction or capable of splitting off acid.

Synthetic resin components suitable for the purpose of the invention are compounds capable of forming with an aldehyde or a substance capable of splitting off aldehyde, condensation products having the character of synthetic resins, for example, melamine, urea, thiourea, phenol, cresol, resorcinol, dicyanodiamide, acetone and the like.

According to an important embodiment of the invention the water soluble starch derivatives used are starch ethers and/or esters with which very favourable results are obtained.

These starch ethers and ester may contain various ether groups, ester groups or combinations of these groups and also the number of said groups per glucose unit may vary to a considerable extent, provided that the starch ethers and ester are soluble or at least swell sufficiently in water.

Generally good results are already obtained with products in which the etherification or esterification degree is appreciably lower than would correspond with a complete conversion of the starch.

Accelerated durability tests in soil have proved that already with an average of about 0.7 ether or ester groups per glucose unit a stability in the soil is attained which for many purposes is satisfactory. Preferably, however, preparations are used which contain at least on an average 1 ether and/or ester group per glucose unit, for it has appeared that such ethers and esters are not or practically not decomposed by the microorganisms in the soil. Generally they will be less attacked with an increasing number of ether or ester groups per glucose unit.

The ethers or esters to be used can be obtained with monofunctional or bi or poly-functional reagents. The first group of ethers and esters is of the greatest importance for the present purpose, because they are more readily soluble in water, but we may also use preparations obtained with mixtures of mono and bi or polyfunctional reagents or even with bi or polyfunctional reagents alone, especially if the latter in addition to the reactive functions (halogen atoms, epoxy oxygen atoms or the like) contain one or more hydrophylic groups, more particularly ionogenic groups, such as carboxylic or sulphonic acid groups. In general in the preparations obtained by means of bi or polyfunctional reagents the degree of etherification or esterification should be relatively low, because otherwise the products would not be sufficiently soluble in water.

Examples of etherifying and esterifying agents by means of which starch ethers and esters suitable for the object of the invention may be obtained are halogenated fatty acids, such as chloro acetic acid and bromo propionic acid, halogen hydrins, such as ethylene chlorohydrin, propylene chlorohydrin, glycerol monochloro hydrin, reactive epoxyalkanes, such as epoxyethane, 1,2-epoxy propane, 1,2-epoxy 3-propanol, dialkylsulphates, such as dimethylsulphate and diethylsulphate, alkylhalides, such as methyl chloride and ethyl iodide, chloro ethane sulphonic acid, chloro hydroxy propane sulphonic acid, epoxy propane sulphonic acid, ethylene sulphonic acid, p-benzyl-chloride-sulphonic acid, glycidic acid, ethylene imine, acrylonitrile, acetic acid anhydride, beta propiolactone, polybasic acid anhydrides, such as phthalic acid, succinic acid or maleic acid anhydride, chlorosulphonic acid and the like. Examples of etherifying and esterifying agents of which generally only a limited proportion can be used, are glycerol dichlorohydrin, epichlorohydrin, benzylchloride, chlorobenzylchloride, chloromethyl naphthalene, higher fatty acid chlorides or anhydrides, cyclohexene oxide, styrene oxide, hexadecylethylene oxide, benzoylchloride, p-toluene sulphochloride, higher aliphatic and aromatic isocyanates, and the like. Both with a view to the maintenance of a good solubility in water and with a view to the stability against micro organisms in the soil this last group of reagents is preferably used in combination with the first mentioned etherifying or esterifying agents.

Very favourable results are obtained with hydroxy alkylethers of starch. The solubility and the aggregating properties of said ethers are not adversely affected by the polyvalent cations present in the soil, such as aluminium, calcium, magnesium, iron and copper ions. Mixed hydroxyalkyl carboxyalkyl ethers of starch, more particularly the ethers obtained by the use of reactive epoxy alkanes and halogenated fatty acid, also give excellent results.

The starch ethers and esters may be used in a more or less pure condition. It is not necessary, therefore, to free the reaction mixture obtained in the etherification or esterification process from the salts formed by the reaction, e.g. by precipitation with alcohol or by salting out with inorganic salts, and it will also be satisfactory to use the reaction mixture as such.

The cold swelling starch ethers and esters obtained according to British Patent 601,374 are particularly suitable for the present purpose. They are not only cheap as a result of the simple manufacturing process, but they also offer the important advantage that they consist of porous, more or less spongy flakes, which owing to this structure will completely and readily dissolve in cold water. This method also excellently lends itself for the preparation of the above mentioned hydroxyalkyl carboxyalkyl ethers.

If starch ethers or esters containing ionogenic groups, e.g. carboxyl groups, are used, they are preferably applied in the form of alkali salts. However, they can also be used in the form of alkaline earth salts or salts of other metals; in the last case the ethers or esters should generally also contain other hydrophylic groups, in order that the water solubility be not lost. Such a product may be obtained, for example, by first treating starch in an alkaline medium with monochloro acetic acid sodium and after the etherification by transforming part of the carboxyl groups introduced into the copper salt by the addition of copper sulfate, however, in such a manner that the number of carboxyl groups combined with copper is small as compared with the number of carboxyl groups combined with sodium.

The starch ethers and/or esters may also be used in the way described above in combination with an aldehyde or with an aldehyde and a synthetic resin component. In this case a further improvement of the stability is obtained.

According to an embodiment of the invention instead of the starch ethers and/or esters soluble or swelling in water we may use similar ethers and/or esters derived from other polysaccharides which in hot water are soluble or swell to a viscous colloidal mass. Examples of such polysaccharides are the vegetable gums, such as gum arabic, gum karaya, gum shiraz, gum tragacanth, carob gum, tamarind flour, guar, konjak flour, pectin, aliginates and the like. The most active and most stable products are again those which at least contain one ether and/or ester group per glucose unit.

It is also possible to use mixtures of ethers and/or esters of various polysaccharides, e.g. of starch and of carob gum. Such preparations may be obtained by etherifying or esterifying the polysaccharides separately and mixing the ethers or esters obtained, or by subjecting a mixture of the polysaccharides to the etherifying or esterifying process, e.g. according to British Patent 601,374.

The incorporation of cold swelling starches (including both the ordinary and degraded cold swelling starches and the cold starches modified by any of the above described methods, i.e. by the addition of aldehydes or aldehydes and synthetic resin components or by etherification and/or esterification into the soil) may be effected in various manners. Thus it is possible to introduce the cold swelling starches as such or dissolved in water into the soil. In many cases, however, it is of advantage to use mixtures of the cold swelling starches with solid diluents or carriers and the invention also relates to the manufacture of soil conditioners consisting of such mixtures.

As solid diluents a great many substances may be used, more particularly inert carriers, such as earth, sand, marl, clay, chalk, china clay, talc, bentonite, gypsum, starch, cereal flours, soluble starch and dextrin, while for agricultural uses fertilizers may also be used as solid diluents.

Generally speaking the use of solid diluents offers the advantage that owing to the larger volume of the product a uniform distribution thereof over the soil is facilitated, while in many cases the spreading properties of the product are also improved.

If the cold swelling starch is introduced into the soil in dissolved condition the auxiliary materials discussed above, such as the aldehyde, the synthetic resin component, the precondensate, the catalyst and the preservative may also be added to the cold swelling starch solution. In said solution the cold swelling starch, the aldehyde and the precondensate may already have reacted, provided that the condensation has not proceeded so far that insoluble condensation products have been formed.

For agricultural uses other substances desired in the soil may be added to said mixtures of cold swelling starches and solid diluents, more particularly agricultural chemicals, such as herbicides, insecticides, fungicides, spore elements and the like. Said substances may also be added to the cold swelling starches which are not mixed with a solid diluent.

The amount of diluent or carrier may vary within wide ranges. Thus it is possible to use mixtures in which the proportions of cold swelling starch and diluent are of the same order of magnitude.

The soil conditioners described hereinbefore are generally obtained by intimately mixing the cold swelling starch and the solid diluent. If desired, the diluent or the carrier may also be added prior to the conversion into cold swelling starch of the mixture of starch, water and further additions.

In case as diluents substances are used which per se have a function in the soil and which are insoluble or poorly soluble in water, the circumstance that said substances are introduced into the soil in admixture with cold swelling starches, offers the additional advantage that generally cold swelling starches are good stabilizers, so that they will promote the solution, emulsification or dispersion of the said diluents. This advantage is more particularly of importance if according to an embodiment of the invention the mixtures of cold swelling starch and diluent are emulsified or dispersed in water prior to their use. Thus emulsions or dispersions are obtained which may be easily sprayed or atomized.

For the practical application of the invention the cold swelling starches offer the advantage that they may be introduced in dry condition into the soil where they will rapidly dissolve or swell in the moisture present, so that they will immediately become active and exert their aggregating and stabilizing action on the soil.

What has been said above concerning the way in which the cold swelling starches, including the cold swelling starch ethers and/or esters, are to be used, also applies to other polysaccharide ethers and/or esters which are soluble or swell in water.

In so far starch products are used which are not soluble or which do not swell in cold water they have to be first dissolved in hot water whereby they are gelatinized, prior to the incorporation in the soil. In these solutions the starch product may be similarly modified or stabilized as described hereinbefore in connection with the cold swelling starches. It is possible, for example, to add a preservative, an aldehyde and a synthetic resin component or a synthetic resin precondensate and if desired a catalyst promoting the condensation to the solution of the starch product, either hot or after cooling. In this solution a certain degree of condensation may already have occurred, provided that said condensation has not progressed so far that insoluble products have already formed.

The soil conditioners according to the invention may be used for various purposes, e.g. for preventing erosion under the influence of wind and rain, for increasing the productivity of the soil, for reclaiming cultivated land, for quick building of lawns and the like.

The soil conditioners claimed may be used in combination with each other or with other known soil conditioners, such as hydrolyzed polyacrylonitrile and carboxymethylcellulose.

Another important application of the products according to the invention, more particularly of the cold swelling starches containing synthetic resin precondensates, is the stabilization of the soil in the construction of roads, levees, air fields, and the like. If desired, the products according to the invention may be used for this purpose in combination with other soil stabilizers, such as e.g. abietic acid, asphalt or tar emulsions and the like, so that the surface of the soil is not only stabilized, but is at the same time rendered water repellent.

The proportion of starch product to be incorporated into the soil may vary and depends on the nature of the soil to be improved and the purpose in view. For agricultural purposes, such as the improvement of the crumb structure of cultivated land, the fighting of erosion and the like, a suitable proportion is about 0.05–0.5%, calculated on the soil. For the purpose of stabilizing the soil the proportion to be used may be considerably higher, however, and may vary of from 1 to 10%, while in particular cases even higher percentages may be used.

The starch ethers and/or esters are particularly stable in the soil. This stability is due to the fact that the polysaccharide ethers and esters are not or substantially not attacked by micro-organisms. An absolute stability of the preparation is not always necessary, however, and sometimes an activity of a few months will be quite satisfactory.

In such cases a degree of substitution averaging less than 1 ether or ester group per glucose unit or structure unit will be sufficient as a rule. If, however, higher demands are made on the stability of the soil and if it is desired that the products remain active for more than one season, polysaccharide ethers or esters are preferably used which contain at least one ether or ester group per glucose unit or structure unit. By a correct choice of the number and/or the nature of the ether or ester groups introduced it is possible in a very simple manner to find the most suitable compound for each particular case.

It has been found that the cold swelling starch ethers and/or esters, more particularly the hydroxyalkyl ethers, when used in the same concentration, have a stronger, in many cases a considerably stronger action than other substances which have been recommended as soil conditioners e.g. carboxymethylcellulose or hydrolyzed polyacrylonitrile.

The different kinds of cold swelling starch furthermore offer the important advantage of dissolving or swelling very rapidly in cold water, so that they will immediately become active in the soil and exert their aggregating and stabilizing influence thereon. Especially during long periods of drought and sunny weather this great reversibility of the ethers and esters claimed is extremely important.

The soil conditioners according to the invention also offer the advantage of being cheap to manufacture, so that owing to their relatively low price they come into consideration for a wide range of applications.

The invention will be illustrated with reference to the following examples.

EXAMPLE I 1000 parts by weight of finely ground, air dry, sandy soil containing loam are intimately mixed with 3 parts by weight of a cold swelling starch prepared from potato starch, whereupon the soil is homogeneously moistened with 18–20% of water. The moist soil is subsequently forced through a screen having meshes of 4.2 mms. From the crumbs obtained the fraction having a diameter of 3.1–4.2 mms. is separated by screening. The remainder of the soil is likewise worked up into aggregates of said size by kneading and screening. One half of the moist crumbs having a diameter of 3.1–4.2 mms. thus obtained is air dried for about 24 hours, while the other half is for the same time stored in closed jars. From the air dried aggregates and from those kept in moist condition the fraction having a diameter of 3.1–4.2 mms. is again separated by screening. In the same manner the untreated soil is converted into both air dry and moist aggregates having a diameter of 3.1–4.2 mms. for purposes of comparison.

The fractions thus obtained are subsequently subjected to the so-called percolation test, which is carried out as follows:

40 grams of air dry or moist aggregates are introduced into a tube having a diameter of 2.7 cms.

Water is carefully introduced at the bottom until the entire percolation tube is filled. The tube is then connected at the upper end with an overflow vessel, so that a constant pressure head of the water is obtained, which in the tests referred to amounted to about 17 cms. The volume of water which during the first 6 minutes flows through the tube containing the soil aggregate is accurately measured and forms a criterion for the aggregating power of the product tested and for the stability of the aggregates against water.

For the untreated soil and for the soil treated with cold swelling starch the values mentioned in Table I were found.

Table I

|  | Volume water in cm.³ obtained by a 6 minutes' percolation | |
|---|---|---|
|  | a. air dry crumbs | b. moist crumbs |
| Untreated soil | 63 | 9 |
| Soil+0.3% of cold swelling starch | 4,500 | 950 |
| Soil+0.3% of corn starch in dissolved condition | 3,720 | 30 |

EXAMPLE II 500 parts by weight of air dry sandy soil containing loam are uniformly moistened with 100 parts by weight of a 1½% solution of corn starch, whereupon the moist soil is worked up into aggregates having a diameter of 3.1–4.2 mms. in the manner described in Example I. One half of the aggregates obtained is air dried, the other half being stored in moist condition. The air-dry and the moist crumbs are subsequently submitted to the percolation test, described in Example I. The values found by this test are also mentioned in the above Table I.

EXAMPLE III

Air dry, sandy soil containing loam is intimately mixed with 0.3% by weight of a formaldehyde cold swelling starch obtained by converting potato-starch in the presence of 20% of formaldehyde into cold swelling starch according to Example I of British Patent No. 632,789. The soil is subsequently uniformly moistened with about 20% of water, whereupon one half of the moist soil is immediately worked up into aggregates having a diameter of 3.1–4.2 mms. The other half of the moist soil is stored for two weeks in a closed jar at 35° C. and thereupon likewise worked up into air-dry crumbs of the same size.

For purposes of comparison the same test is run with the same soil to which 0.3% of untreated cold swelling starch prepared from potato starch has been added. The air-dry crumbs with a diameter of 3.1–4.2 mms. obtained in both tests are subjected to the percolation test described in Example I, the values found being listed in Table II.

Table II

| Product | Volume of water in cm.³ obtained by a 6 minutes' percolation after— | |
|---|---|---|
|  | 0 days | 14 days |
| Aldehyde cold swelling starch | 4,500 | 4,200 |
| Cold swelling starch | 4,300 | 520 |

EXAMPLE IV 1000 parts by weight of air dry sandy soil containing loam are intimately mixed with 1.25 parts by weight of ammonium chloride and 25 parts by weight of a cold swelling starch prepartion consisting of a cold swelling starch manufactured by the conventional process containing 25% of dimethylol urea. The soil is subsequently moistened with water until the moisture content is approximately 10%, calculated on dry matter. Of the soil thus obtained discs (diameter 5.5 cms.) were made by means of a ramming apparatus, 50 grams of moist soil being used each time. For a blank test discs were similarly made from untreated moist soil. The discs obtained were air dried for 48 hours.

The soil discs stabilized by means of the cold swelling starch preparation have an average hardness of 0.2 mm. measured by means of the Georg Fischer hardness meter type GM-578 and when stored under water they do not disintegrate for a period of several weeks. The non-stabilized soil discs on the other hand, immediately disintegrate when brought in contact with water, while their hardness only amounts to 5 mms. In contradistinction to the untreated soil, the soil treated with the said cold swelling starch is accordingly stabilized to a considerable extent.

EXAMPLE V 1500 parts by weight of air dry sand are intimately mixed with 105 parts by weight of a stabilizer, consisting of a mixture of 200 parts by weight of an ordinary non-degraded cold swelling starch and 500 parts by weight of gypsum. The sand is subsequently moistened with about 10% of water, whereupon in the manner described in Example IV discs are prepared for which each time 50 grams of moist sand are used.

In a similar way discs are made from moist sand which previously was intimately mixed in dry condition with 5% by weight of gypsum.

The discs obtained are air dried for about 48 hours, whereupon they are tested on their hardness and stability against water. The sand discs stabilized by means of cold swelling starch and gypsum appear to be very stable and have a hardness of 0.9 mm. determined by means of the Georg Fischer hardness meter type GM-578, whereas the sand discs only stabilized by means of gypsum will disintegrate in water within a few minutes and are so soft that their hardness could not be determined.

EXAMPLE VI

Into an alkali starch paste obtained by mixing 1000 parts by weight of cassava starch, 2000 parts by weight of water and 200 parts by weight of a 30% caustic soda solution 200 parts by weight of epoxy ethane are introduced at a temperature of 40–60° C. while stirring. After a reaction time of from 1–2 hours the alkaline mass is neutralized with hydrochloric acid. 200 parts by weight of a methylated hexamethylol melamine are now added and the entire reaction mass is brought into dry condition in the manner described in British Patent 632,791. 20 parts by weight of the cold swelling starch preparation thus prepared are intimately mixed in finely ground condition with 1000 parts by weight of air-dry sandy soil containing loam. The soil is subsequently moistened with 100 parts by weight of 1% phosphoric acid, whereupon discs of 50 grams are made therefrom in the manner described in Example IV.

After a three days storage in the air the discs have a good water stability and a hardness of 0.6 mm. Air dried discs of the untreated soil immediately disintegrate in water and are too soft for determining the hardness by means of the Georg Fischer hardness meter type GM-578. This shows that the physical properties of the soil are considerably modified by the addition of a small proportion of said cold swelling starch preparation.

EXAMPLE VII

In an alkaline medium 2000 parts by weight of potato starch are in known manner successively treated with 340 parts by weight of epoxy ethane and 950 parts by weight of mono chloro acetic acid, whereupon the reaction mass is brought in dry condition in the manner described in British Patent 601,374.

100 parts by weight of the mixed hydroxyethyl carboxymethyl ether of cold swelling starch thus obtained are finely ground and intimately mixed with 60 parts by weight of china clay. This mixture is a valuable soil conditioner which in as low a percentage as 0.1–0.3% rapidly and to a considerable degree improves the structure of various soils such, for example, of a sandy soil containing loam and of clay, owing to the formation of water resistant aggregates.

EXAMPLE VIII

Into an alkali starch paste, obtained by mixing 1000 parts by weight of cassava starch, 2000 parts by weight of water and 200 parts by weight of a 30% caustic soda solution, 400 parts by weight of epoxy ethane are introduced at a temperature of 40–60° C., while stirring. After a reaction time of from 3–4 hours the alkaline mass is neutralized with nitric acid and the entire reaction mixture is dried under reduced pressure. An analysis shows that the hydroxyethyl ether of cassava starch thus prepared contains an average of 1.4 ether groups per glucose unit. Accelerated durability tests in the soil, carried out at 35° C., showed that the product obtained after being stored for three months in warm moist soil had lost nothing of its original activity. Seeing that the starch ether is hygroscopic and consequently difficult to homogeneously distribute in the soil to be treated, a powdered easily spreadable soil conditioner is produced by passing a mixture of 100 parts by weight of the starch ether and 150 parts by weight of chalk a few times through a disintegrator, so as to obtain a final product completely passing through a screen having meshes of 0.15 mm.

EXAMPLE IX

Into an alkali starch paste obtained by intimately mixing 1000 parts by weight of starch, 1200 parts by weight of hot water and 125 parts by volume of 10 n caustic potash lye 100 parts by weight of epoxy ethane are introduced at a temperature of from 50–60° C. in the course of five hours. After a total reaction period of six hours the reaction mass is neutralized with phosphoric acid and diluted with water to a starch ether concentration of about 1%.

With this solution a cultivated soil having a strong tendency to dust formation in spring was sprayed. It appeared that this undesirable phenomenon was effectively prevented. Upon analysis of the pure product the starch hydroxyethyl ether used was found to have a degree of substitution of 2.1 i.e. to contain 2.1 ether groups per pyranose ring.

EXAMPLE X

An alkaline paste of potato starch is treated in the manner described in Example VII with 29% by weight of 1.2 epoxy propane, calculated on the air dry starch. After a reaction time of 1–2 hours the alkaline mass is neutralized with sulphuric acid, whereupon the reaction mass is brought in dry form in the manner described in British Patent 601,374.

The cold swelling starch hydroxyalkyl ether thus prepared was found to contain 0.6 ether group per glucose unit in pure condition.

The product obtained is mixed with an equal amount by weight of the mixed fertilizer commercially known as N.P.K. (12–10–20), whereupon a dilute solution of the mixture in water is prepared. In this dilute solution grass seed is dispersed in the desired proportion and the dispersion is subsequently sprayed on a pretreated soil. After this treatment with the soil conditioner, seed and fertilizer, the surface layer of the soil is further worked in a conventional manner.

EXAMPLE XI 2000 parts by weight of cassava starch, 2500 parts by weight of water and 2100 parts by volume of a 10 n caustic soda solution are intimately mixed. To the alkaline starch paste a solution of mono chloro acetic acid sodium is added, said solution having been obtained by carefully neutralizing a solution of 2000 parts by weight of commercial monochloroacetic acid in 800 parts by weight of water with a 30% caustic soda solution. The reaction mass is heated for two hours to a temperature of 70-80° C., while stirring, whereupon the mass is intimately mixed with 3500 parts by weight of bentonite. The entire mixture is subsequently pressed out on a heated rotating cylinder, to a thin layer, which is dried simultaneously or immediately afterwards. Subsequently the product obtained is ground so fine that it completely passes through a screen having meshes of 0.15 mm.

It is found that the soil conditioner thus prepared, even when used in very small percentages, considerably increases the content of water resistant aggregates of sandy soils containing loam for a long time.

The action on the soil of the starch ethers and cold swelling starch ethers described in Examples VII–XI was compared with that of cold swelling starch and of three commercial soil conditioners, according to the method described in Example I. For this purpose we used (1) Colloresin MV, a carboxymethylether of cellulose.

(2) sodium alginate.

(3) Aerotil (wettable flakes), which is mainly a hydrolyzed polyacrylonitrile.

All products were ground to the same degree of fineness, added to a sandy soil containing loam in a proportion of 0.3%, and the aggregating power was determined by the method described in Example I.

In addition to the aggregating power of the various prducts the durability of the activity of said products in the soil was determined. To this end the samples of moist soil were stored in jars at a temperature of 35° C., care being taken that the soil was occasionally aerated. At regular intervals a portion of the soil kept at 35° C. was granulated into crumbs having a diameter of from 3.1–4.2 mms. in the manner described and subjected to the percolation test after drying in the air.

The activity of the products in sandy soil containing loam and the results of the accelerated durability test are listed in the subjoined table.

Table

| Product | Volume of water in cc. obtained by a 6 minutes' percolation, after— | | | |
|---|---|---|---|---|
| | 0 days | 15 days | 30 days | 60 days |
| Untreated | 310 | | | |
| Cold swelling starch | 3,920 | 360 | | |
| Cold swelling starch ether according to Example VII | 4,480 | 5,380 | 5,220 | 5,300 |
| Starch ether according to Example VIII | 6,240 | 5,600 | 5,260 | 5,500 |
| Starch ether according to Example IX | 5,500 | 5,480 | 5,600 | 5,370 |
| Cold swelling starch ether according to Example X | 5,250 | 4,300 | 3,600 | 2,000 |
| Cold swelling starch ether according to Example XI | 3,720 | 4,080 | 4,340 | 4,220 |
| Colloresin MV | 2,400 | 95 | | |
| Sodium alginate | 580 | | 142 | |
| Aerotil (wettable flakes) | 4,600 | 4,560 | 4,400 | 4,270 |

From these tests it appears that non-etherified cold swelling starch after 15 days has substantially lost its activity in moist sandy soil containing loam at 35° C. Starch ethers having a degree of substitution of more than 1 per glucose unit (Examples VII, VIII, IX and X) on the other hand have completely or almost completely retained their activity under the same conditions after 60 days. The product according to Example IV having a degree of substitution of 0.6 ether group per glucose unit has lost more than half its original activity in the same time, but nevertheless still shows an appreciable effect, if the soil treated with this preparation is compared with the untreated soil. Of the other products sodium alginate only appears to have a small activity in this sandy soil, containing loam, while Colloresin MV initially shows an appreciable effect which, however, soon disappears. The soil conditioner Aerotil on the other hand is very effective and also is resistant against the microorganisms in the soil.

We claim:

1. A method of stabilizing the soil surface against erosion, which comprises dispersing a cold water swelling starch in cold water and uniformly spraying the dispersion so prepared on the surface of the soil, to provide a layer of said cold water swelling starch on the surface of the soil.

2. A method according to claim 1 in which the cold water swelling starch is a cold water swelling starch ether.

3. A method according to claim 1 in which the cold water swelling starch is a cold water swelling starch ether containing an average of at least 0.7 ether groups per structure unit of the starch.

4. A method according to claim 1 in which the cold water swelling starch is a cold water swelling starch ester.

5. A method according to claim 1 in which the cold water swelling starch is a cold water swelling starch mixed ether-ester.

6. A method according to claim 1 in which the cold water swelling starch contains a preservative.

7. A method according to claim 1 in which the cold water swelling starch contains formaldehyde.

8. A method according to claim 1 in which the cold water swelling starch contains an aldehyde and a synthetic resin component capable of forming a synthetic resin-like condensation product with the formaldehyde, said synthetic resin component being selected from the group consisting of urea, thiourea, melamine, phenols, dicyanodiamide and acetone.

9. A method according to claim 1 in which the cold water swelling starch is added to the surface soil in pulverulent form.

10. A method according to claim 1 in which an aqueous solution of a cold water swelling starch is sprayed on the soil surface.

References Cited in the file of this patent

UNITED STATES PATENTS

| | | |
|---|---|---|
| 1,988,307 | Fay | Jan. 15, 1935 |
| 2,030,461 | Moss | Feb. 11, 1936 |
| 2,341,800 | Martin et al. | Feb. 15, 1944 |
| 2,527,581 | Seares et al. | Oct. 31, 1950 |
| 2,583,268 | Lolkema | Jan. 22, 1952 |
| 2,648,165 | Nestor | Aug. 11, 1953 |

OTHER REFERENCES

Quastel et al.: Jour. of Agricultural Science, volume 37, No. 3, July 1947, pages 257–266.

Martin: Soil Science, volume 61, No. 2, February 1946, pages 157–166.

Geoghegan: Fourth Int. Congress of Soil Science Transaction, July–August 1950, pages 198–201.